United States Patent
Suzuki (10) Patent No.: US 11,050,898 B2
(45) Date of Patent: Jun. 29, 2021

(54) WIRELESS COMMUNICATION APPARATUS, IMAGE FORMING APPARATUS, AND METHOD OF CONTROLLING IMAGE FORMING APPARATUS

(71) Applicant: TOSHIBA TEC KABUSHIKI KAISHA, Tokyo (JP)

(72) Inventor: Takaaki Suzuki, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/565,734

(22) Filed: Sep. 10, 2019

(65) Prior Publication Data
US 2021/0075929 A1   Mar. 11, 2021

(51) Int. Cl.
| | |
|---|---|
| *H04N 1/00* | (2006.01) |
| *H04W 4/80* | (2018.01) |
| *H04W 76/10* | (2018.01) |
| *H04W 52/02* | (2009.01) |
| *H04N 1/32* | (2006.01) |

(52) U.S. Cl.
CPC ..... *H04N 1/00896* (2013.01); *H04N 1/32539* (2013.01); *H04W 4/80* (2018.02); *H04W 52/0235* (2013.01); *H04W 76/10* (2018.02); *H04N 2201/0055* (2013.01); *H04N 2201/0074* (2013.01); *H04N 2201/0094* (2013.01)

(58) Field of Classification Search
CPC combination set(s) only.
See application file for complete search history.

(56) References Cited

U.S. PATENT DOCUMENTS

| | | | |
|---|---|---|---|
| 2013/0258401 A1* | 10/2013 | Suzuki | H04W 52/0206 358/1.15 |
| 2016/0269591 A1* | 9/2016 | Morishita | G06F 3/1236 |
| 2017/0041475 A1* | 2/2017 | Won | H04N 1/32101 |

* cited by examiner

*Primary Examiner* — Helen Zong
(74) *Attorney, Agent, or Firm* — Amin, Turocy & Watson, LLP (57) ABSTRACT

According to one embodiment, a wireless communication apparatus includes a communication interface and a processor. The communication interface performs wireless communication with other wireless communication apparatuses and a client giving an instruction for an operation. The processor switches a power state of the communication interface and the other wireless communication apparatus based on information regarding validation and invalidation of wireless communication functions, simultaneous connection numbers, and connectable numbers of the other wireless communication apparatuses.

20 Claims, 6 Drawing Sheets

| MFP | PRIORITY | WIRELESS COMMUNICATION FUNCTION : STATE | SIMULTANEOUS CONNECTION NUMBER | CONNECTABLE NUMBER |
|---|---|---|---|---|
| M | 1 | Wi-Fi Direct : VALID | 2 | 10 |
| S1 | 2 | Wi-Fi Direct : VALID | 2 | 5 |
| S2 | 3 | Wi-Fi Direct : VALID | 0 | 5 |
| S3 | 4 | NON-CORRESPONDENCE | – | – |

FIG. 5

WIRELESS COMMUNICATION APPARATUS, IMAGE FORMING APPARATUS, AND METHOD OF CONTROLLING IMAGE FORMING APPARATUS

FIELD

Embodiments described herein relate generally to a wireless communication apparatus, an image forming apparatus, and a method of controlling the image forming apparatus.

BACKGROUND

Wireless communication apparatuses performing wireless communication in conformity with various wireless communication schemes are practically used. Image forming apparatuses that have wireless communication functions are also practically used. Image forming apparatuses that have wireless communication functions can receive printing data from various clients (PCs, smartphones, tablets, or the like) that has wireless communication functions through wireless communication and perform printing.

There is a technology for distributing connection destinations to a plurality of image forming apparatuses when a plurality of clients is simultaneously connected to the image forming apparatuses.

The foregoing image forming apparatuses are configured to maintain wireless communication functions with the wireless communication functions remaining valid when the clients which are being connected are within ranges communicable through wireless communication (communication ranges). Therefore, there is a problem that image forming apparatuses may not invalidate wireless communication functions and may not transition to a power-saving state even when a use frequency is low.

DETAILED DESCRIPTION

In general, according to one embodiment, a wireless communication apparatus includes a communication interface and a process. The communication interface performs wireless communication with other wireless communication apparatuses and a client giving an instruction for an operation. The processor switches a power state of the communication interface and the other wireless communication apparatus based on information regarding validation and invalidation of wireless communication functions, simultaneous connection numbers, and connectable numbers of the other wireless communication apparatuses.

Hereinafter, a wireless communication apparatus, an image forming apparatus, and a method of controlling the image forming apparatus according to an embodiment will be described with reference to the drawings.

Figure 1:
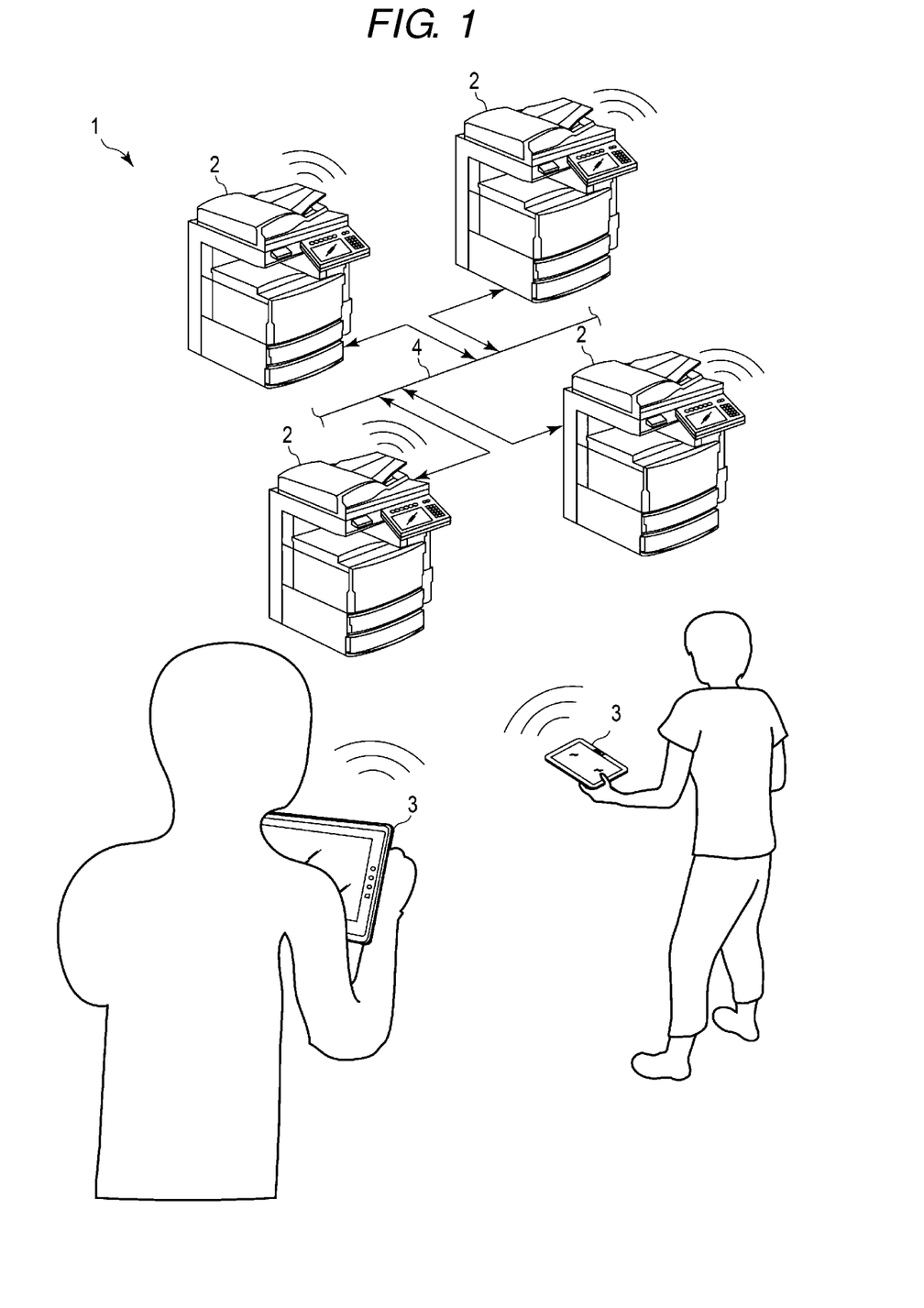
FIG. 1 is a diagram illustrating a configuration example of a wireless communication system according to an embodiment.

FIG. 1 is a diagram illustrating a configuration example of a wireless communication system 1 according to an embodiment.

The wireless communication system 1 includes a plurality of image forming apparatuses 2 and a plurality of information processing apparatuses 3. The plurality of image forming apparatuses 2 of the wireless communication system 1 are connected via a network 4. The plurality of image forming apparatuses 2 and the plurality of information processing apparatuses 3 are connected through wireless communication.

Examples of wireless communication schemes include Wi-Fi (registered trademark), Wi-Fi Direct (registered trademark), and Bluetooth Low Energy (registered trademark). Hereinafter, Bluetooth Low Energy is simply referred to as Bluetooth (registered trademark). In this example, the plurality of image forming apparatuses 2 is assumed to be connected in conformity with Wi-Fi Direct in the description. An apparatus that does not correspond to Wi-Fi Direct and corresponds to Wi-Fi can also be connected to an apparatus that corresponds to Wi-Fi Direct. That is, the plurality of information processing apparatuses 3 which are clients can perform wireless communication with the image forming apparatuses when the information processing apparatuses 3 correspond to at least Wi-Fi. Any communication scheme may be used for wireless communication between the plurality of image forming apparatuses 2 and the plurality of information processing apparatuses 3.

The image forming apparatus 2 is, for example, a multi-functional printer (MFP) that performs various processes such as forming of an image while transporting a recording medium such as a printing medium. The image forming apparatus 2 can also be referred to as a wireless communication apparatus since the wireless communication apparatus has a wireless communication function. The image forming apparatus 2 is, for example, a solid-state scanning type printer (for example, an LED printer) that scans an LED array performing various processes such as image forming while transporting a recording medium such as a printing medium. The image forming apparatus 2 may be an inkjet type printer (inkjet printer) that scans an inkjet head ejecting ink or another type printer.

The image forming apparatus 2 forms an electrostatic latent image on a photosensitive drum by charging the photosensitive drum and radiating light to the photosensitive drum in accordance with image data for printing (printing data). The image forming apparatus 2 attaches toner to the latent image formed on the photosensitive drum and transfers the toner attached to the latent image to the printing medium to form a toner image on the printing medium. In the image forming apparatus 2, the printing medium on which the toner image is formed is pinched between fixing rollers heated with high temperature by a heater to fix the toner image formed on the printing medium.

The information processing apparatus 3 is a client apparatus that supplies printing data to the image forming apparatus 2. The information processing apparatus 3 is, for example, a mobile apparatus such as a notebook PC, a smartphone, or a tablet PC.

The information processing apparatus 3 includes a display (not illustrated), an operation interface, a communication interface, and a system controller.

The display displays a screen in accordance with an input video signal.

The operation interface includes various operation members. The operation interface supplies an operation signal to a system controller in response to an operation on the operation member. The operation member is, for example, a touch sensor. The touch sensor is, for example, a resistive film type touch sensor or an electrostatic capacitance type touch sensor. The touch sensor acquires information indicating a position designated in a certain region. The touch sensor is configured as a touch panel integrated with the display and inputs a signal indicating a position touched on a screen displayed on the display to the system controller.

The communication interface is an interface for performing wireless communication with the image forming apparatus 2. The communication interface performs wireless communication with the image forming apparatus 2 in conformity with Wi-Fi or Wi-Fi Direct.

The system controller controls the information processing apparatus. The system controller includes, for example, a processor and a memory.

The processor is an arithmetic element (for example, a CPU) that performs an arithmetic process. The processor performs various processes based on data such as a program stored in the memory. The processor functions as a control unit capable of performing various operations by executing the program stored in the memory.

The memory is a storage device that stores a program and data used for the program. The memory temporarily stores data which is being processed by the processor. The memory is configured as a nonvolatile memory.

Figure 2:
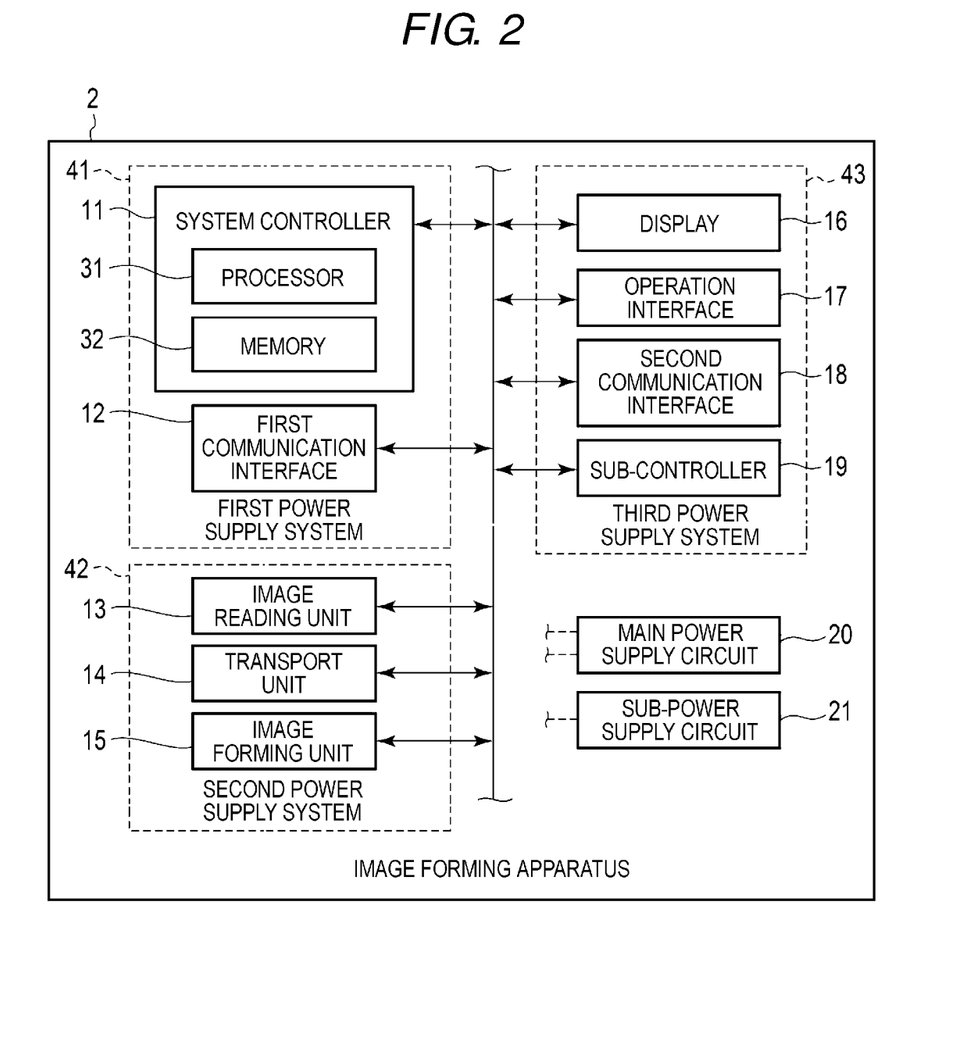
FIG. 2 is a diagram illustrating a configuration example of an image forming apparatus.

Next, a configuration example of the image forming apparatus 2 will be described.

FIG. 2 is a diagram illustrating a configuration example of an image forming apparatus 2. The image forming apparatus 2 includes a system controller 11, a first communication interface 12, an image reading unit 13, a transport unit 14, an image forming unit 15, a display 16, an operation interface 17, a second communication interface 18, a sub-controller 19, a main power supply circuit 20, and a sub-power supply circuit 21. The system controller 11, the first communication interface 12, the image reading unit 13, the transport unit 14, the image forming unit 15, the display 16, the operation interface 17, the second communication interface 18, the sub-controller 19, the main power supply circuit 20, and the sub-power supply circuit 21 are accommodated in a casing (not illustrated).

The system controller 11 controls the image forming apparatus 2. The system controller 11 includes, for example, a processor 31 and a memory 32.

The processor 31 is an arithmetic element (for example, a CPU) that performs an arithmetic process. The processor 31 is a main unit of an operation of the system controller 11. The processor 31 performs various processes based on data such as a program stored in the memory 32. The processor 31 functions as a control unit capable of performing various operations by executing a program stored in the memory 32.

The memory 32 is a storage device that stores a program and data to be used for the program. The memory 32 temporarily stores data that is being processed by the processor 31. The memory 32 is configured as a nonvolatile memory.

The first communication interface 12 is an interface that performs wireless communication with the information processing apparatus 3. The first communication interface 12 performs wireless communication with the information processing apparatus 3 in conformity with Wi-Fi Direct.

The image reading unit 13 is configured to read an image from an original document. The image reading unit 13 includes, for example, a scanner and an automatic document feeder (ADF). The scanner reads an original document from a side facing an original document on a glass plate on which the original document is placed. The image reading unit 13 acquires images of the entire document, for example, by causing the scanner to acquire the images while moving the scanner. The image reading unit 13 acquires images of an entire original document, for example, by causing the scanner to acquire the images while causing the ADF to pass the original document at a reading position of the scanner.

The transport unit 14 is configured to supply a medium for printing (printing medium) to the image forming unit 15 and discharge the printing medium on which an image is formed by the image forming unit 15 from the casing. The transport unit 14 supplies a printing medium accommodated in a paper feed cassette (not illustrated) that accommodates printing media to the image forming unit 15 one by one. The transport unit 14 discharges the printing medium on which the image is formed by the image forming unit 15 to a paper discharge tray outside of the casing.

The image forming unit 15 forms an image on a printing medium under the control of the system controller 11. The image forming unit 15 includes a process unit, an exposure unit, a transfer mechanism, and a fixer.

The process unit includes a photosensitive drum, an electrostatic charger, and a developing unit.

The photosensitive drum is a photoreceptor that includes a cylindrical drum and a photosensitive layer formed on the outer circumferential surface of the drum. The photosensitive drum is rotated at a given speed by a driving mechanism (not illustrated).

The electrostatic charger uniformly electrifies the surface of the photosensitive drum. For example, the electrostatic charger electrifies the photosensitive drum with a uniform negative-polarity potential by applying a voltage to the photosensitive drum using an electrostatic roller.

The developing unit attaches toner to the photosensitive drum. The developing unit includes a developer container, a stirring mechanism, a developing roller, and a doctor blade.

The developer container receives toner sent from a toner cartridge and contains the toner. Carriers are accommodated in advance in the developer container. The toner sent from the toner cartridge is stirred with the carriers by the stirring mechanism to form developer in which the toner and the carriers are mixed. The carriers are accommodated in the developer container at the time of manufacturing the developing unit.

The developing roller is rotated inside the developer container to attach the developer on the surface of the developing roller. The doctor blade is a member that is disposed at a predetermined gap with the surface of the developing roller. The doctor blade removes a part of the developer attached to the surface of the rotating developing roller. Thus, a layer of the developer of the thickness in response to a gap between the doctor blade and the surface of the developing roller is formed on the surface of the developing roller.

The exposure unit includes a plurality of light-emitting elements. The exposure unit forms a latent image on the photosensitive drum by radiating light from the light-emitting elements to the electrified photosensitive drum. The light-emitting element is, for example, a light-emitting diode (LED) or the like. One light-emitting element is configured to radiate light to one point on the photosensitive drum. The plurality of light-emitting elements is arrayed in a main scanning direction which is a direction parallel to a rotation shaft of the photosensitive drum.

The exposure unit forms a latent image equivalent to one line on the photosensitive drum by radiating light from the plurality of light-emitting elements arrayed in the main scanning direction to the photosensitive drum. Further, the exposure unit forms a latent image of a plurality of lines by continuously radiating light to the rotating photosensitive drum.

In the foregoing configuration, when light is radiated from the exposure unit to the surface of the photosensitive drum electrified by the electrostatic charger, an electrostatic latent image is formed. When the layer of the developer formed on the surface of the developing roller approaches the surface of the photosensitive drum, the toner included in the developer is attached to the latent image formed on the surface of the photosensitive drum. Thus, a toner image is formed on the surface of the photosensitive drum.

The transfer mechanism transfers the toner image formed on the surface of the photosensitive drum to the printing medium. The transfer mechanism includes a primary transfer belt, a secondary transfer roller, and a plurality of other rollers. The transfer mechanism receives the toner image formed on the surface of the photosensitive drum on the outer circumferential surface of the primary transfer belt. The transfer mechanism transports the toner image on the outer circumferential surface of the primary transfer belt up to a transfer nip at which the secondary transfer roller is in a close contact with the outer circumferential surface of the primary transfer belt. The transfer mechanism transfers the toner image on the outer circumferential surface of the primary transfer belt to the printing medium by passing the printing medium supplied by the transport unit 14 through the transfer nip.

The fixer fixes the toner image transferred to the printing medium to the printing medium. The fixer includes a heating member (heat roller) that gives heat to a printing medium, a pressurizing member (press roller) that gives a pressure to a printing medium, and a heater that heats the heat roller. The press roller applies a pressure to the heat roller to form a fixing nip at which the press roller is in a close contact with the heat roller. The fixer gives heat and pressure to the printing medium by passing the printing medium to which the toner image is transferred by the transfer mechanism through the fixing nip. Thus, the fixer fixes the toner image formed on the printing medium. The printing medium passing through the fixing nip is discharged to a paper discharge tray by the transport unit 14.

The display 16 displays a screen in accordance with a video signal input from the system controller 11 or a display control unit such as graphic controller (not illustrated). For example, the display 16 displays a screen for various kinds of setting of the image forming apparatus 2.

The operation interface 17 includes various operation members. The operation interface 17 supplies operation signals to the system controller 11 in response to operations of the operation members. The operation members are, for example, a touch sensor, numeric keys, a sheet feed key, a power key, various function keys, a keyboard, or the like. The touch sensor is, for example, a resistive film type touch sensor or an electrostatic capacitance type touch sensor. The touch sensor acquires information indicating a position designated inside a certain region. The touch sensor is configured as a touch panel integrated with the display 16 and inputs a signal indicating a position touched on a screen displayed on the display 16 to the system controller 11.

The second communication interface 18 communicates with the other image forming apparatuses 2 via the network 4. For example, the second communication interface 18 communicates with the other image forming apparatuses 2 in conformity with a wired LAN, Bluetooth, or any of other communication schemes.

The sub-controller 19 controls the image forming apparatuses 2. The sub-controller 19 includes, for example, a processor and a memory.

The processor is an arithmetic element (for example, a CPU) that performs an arithmetic process. The processor performs various processes based on data such as a program stored in the memory. The processor functions as a control unit capable of performing various operations by executing the program stored in the memory.

The memory is a storage device that stores a program and data used for the program. The memory temporarily stores data which is being processed by the processor. The memory is configured as a nonvolatile memory.

The main power supply circuit 20 converts an alternating-current voltage supplied from an alternating-current power supply into a desired direct-current voltage and supplies the direct-current voltage to various constituents of the image forming apparatus 2. The main power supply circuit 20 supplies the direct-current voltage to each of the first power supply system 41 and the second power supply system 42. The main power supply circuit 20 can individually turn on or off the first power supply system 41 and the second power supply system 42.

The first power supply system 41 includes the system controller 11 and the first communication interface 12. That is, when the main power supply circuit 20 turns on the first power supply system 41, a direct-current voltage is supplied to the system controller 11 and the first communication interface 12.

The second power supply system 42 includes the image reading unit 13, the transport unit 14, and the image forming unit 15. That is, when the second power supply system 42 is turned on, the main power supply circuit 20 supplies the direct-current voltage to the image reading unit 13, the transport unit 14, and the image forming unit 15.

The sub-power supply circuit 21 converts an alternating-current voltage supplied from an alternating-current power supply into a desired direct-current voltage and supplies the direct-current voltage to various constituents of the image forming apparatus 2. The sub-power supply circuit 21 supplies the direct-current voltage to a third power supply system 43. The sub-power supply circuit 21 can turn on or off the third power supply system 43. The sub-power supply circuit 21 may be configured to generate a desired direct-current voltage via an isolation transformer of the main power supply circuit 20 and supply the direct-current voltage to the third power supply system 43.

The third power supply system 43 includes the display 16, the operation interface 17, the second communication interface 18, and the sub-controller 19. That is, when the third power supply system 43 is turned on, the sub-power source circuit 21 supplies the direct-current voltage to the display 16, the operation interface 17, the second communication interface 18, and the sub-controller 19.

Next, a power state of the image forming apparatus 2 will be described.

In the foregoing configuration, the system controller 11 and the sub-controller 19 control the main power supply circuit 20 and the sub-power supply circuit 21 such that the first power supply system 41, the second power supply system 42, and the third power supply system 43 are turned on or off. Thus, the system controller 11 and the sub-controller 19 switch the power state of the image forming apparatus 2. Specifically, the power state of the image forming apparatus 2 is one of a standby mode in which consumption power is the largest, a first power-saving mode in which the power consumption is less than in the standby mode, and a second power-saving mode in which the power consumption is less than in the first power-saving mode.

The standby mode is a standby state in which the first power supply system 41, the second power supply system 42, and the third power supply system 43 are turned on. In the image forming apparatus 2, an operation by the operation interface 17, wireless communication by the first communication interface 12, communication by the second communication interface 18, printing, and document reading are possible in the standby mode.

In the first power-saving mode, the first power supply system 41 and the third power supply system 43 are turned on and the second power supply system 42 is turned off. In the image forming apparatus 2, an operation by the operation interface 17, wireless communication by the first communication interface 12, and communication by the second communication interface 18 are possible in the first power-saving mode. In the image forming apparatus 2, the first power-saving mode transitions to the standby mode when printing data is received from the information processing apparatus 3 through the wireless communication or a predetermined operation is performed by the operation interface 17. In the image forming apparatus 2, the first power-saving mode transitions to the second power-saving mode when a predetermined control signal is received from another image forming apparatus 2.

In the second power-saving mode, the third power supply system 43 is turned on and the first power supply system 41 and the second power supply system 42 are turned off. In the image forming apparatus 2, an operation by the operation interface 17 and communication by the second communication interface 18 are possible in the second power-saving mode. When the image forming apparatus 2 receives a predetermined control signal from another image forming apparatus 2, the second power-saving mode transitions to the first power-saving mode. When a predetermined operation is performed by the operation interface 17 in the image forming apparatus 2, the second power-saving mode transitions to the standby mode or the first power-saving mode.

Next, communication setting between the image forming apparatus 2 and the information processing apparatus 3 will be described.

As described above, the image forming apparatus 2 and the information processing apparatus 3 perform wireless communication in conformity with Wi-Fi Direct. In this case, the first communication interface 12 of the image forming apparatus 2 is used for the wireless communication. That is, when the image forming apparatus operates in the standby mode or the first power-saving mode, the image forming apparatus can perform wireless communication with the information processing apparatus 3.

The image forming apparatus 2 and the information processing apparatus 3 can perform wireless communication by mutually acquiring information for starting the wireless communication. The information for starting the wireless communication is, for example, identification information of a communication partner.

In Wi-Fi Direct, a MAC address, a device name, SSID, or the like is used as the identification information. In Wi-Fi Direct, the image forming apparatus 2 functions as an access point (AP). In Wi-Fi Direct, the information processing apparatus 3 can perform the wireless communication by acquiring SSID of the image forming apparatus 2 functioning as the AP and allowing the image forming apparatus 2 to acquire a MAC address or a device name of the information processing apparatus 3 of a connection partner.

As described above, since the image forming apparatus 2 functions as an AP, the information processing apparatus 3 in a communication range of the image forming apparatus 2 can acquire the SSID of the image forming apparatus 2. The information processing apparatus 3 transmits a connection request including the MAC address or the device name of the self-information processing apparatus 3 to the image forming apparatus 2. In the image forming apparatus 2, a connectable number when the image forming apparatus 2 functions as the AP is set. When the connection request is received and the number of previously connected apparatuses does not reach the connectable number, the image forming apparatus 2 establishes communication with the information processing apparatus 3 transmitting the connection request in conformity to Wi-Fi Direct.

The information processing apparatus 3 transmits printing data to the image forming apparatus 2 when the information processing apparatus 3 establishes the communication with the image forming apparatus 2 in conformity with Wi-Fi Direct. Thus, the image forming apparatus 2 can be allowed to perform printing.

Figure 3:
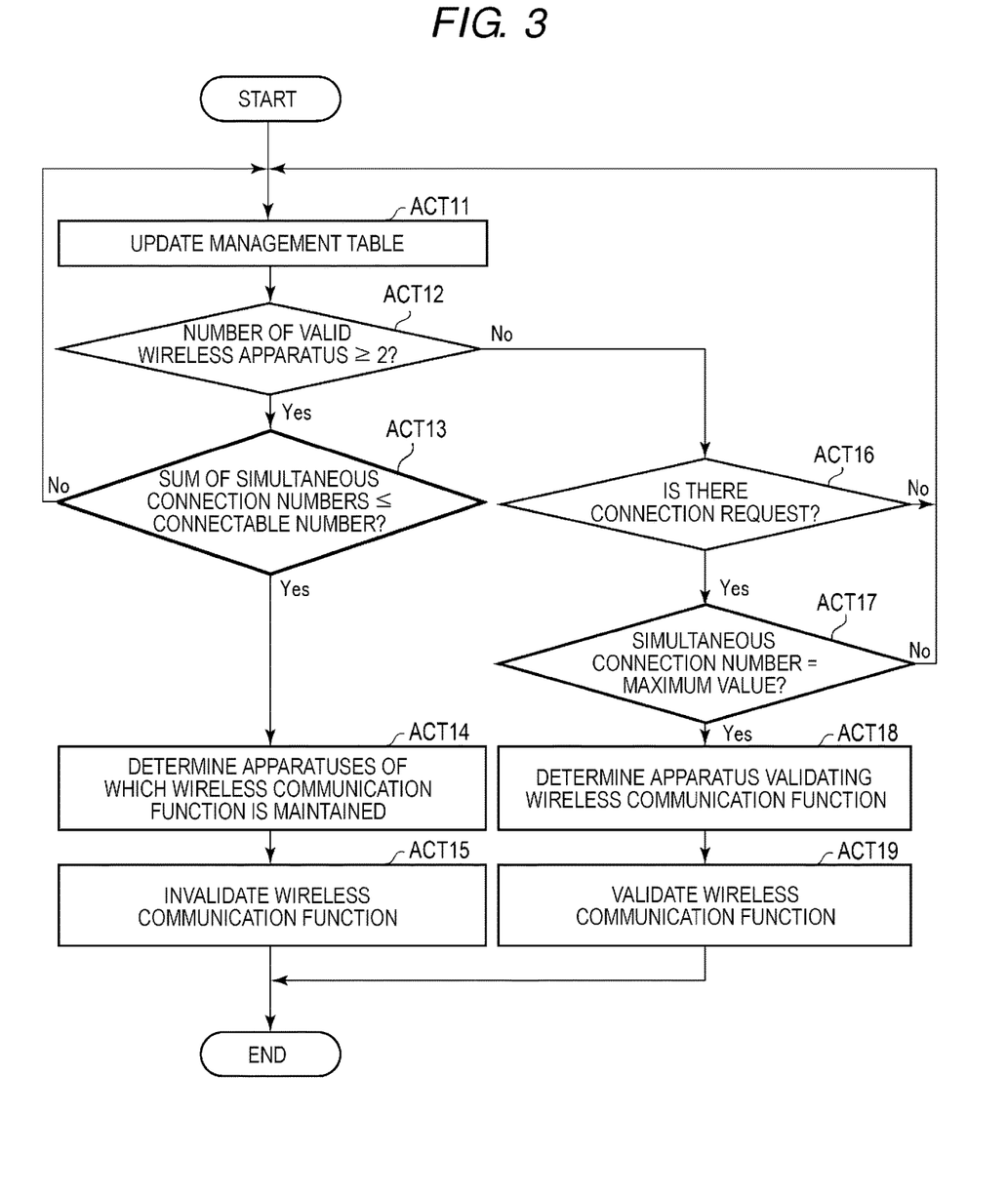
FIG. 3 is a diagram illustrating an example of an operation of the image forming apparatus.

Next, an example of an operation of the image forming apparatus 2 will be described.

FIG. 3 is a diagram illustrating an example of a process of setting wireless communication (a process of reconfiguring a wireless communication apparatus) in the image forming apparatus 2. In the embodiment, the plurality of image forming apparatuses 2 transmit and receive control signals to perform operations in cooperation. One of the plurality of image forming apparatuses 2 functions as the master image forming apparatus 2 controlling operations of the plurality of image forming apparatuses 2 within the same network (referred to as an image forming apparatus 2M). In FIG. 3, an operation of the master image forming apparatus 2M will be described.

The system controller 11 of the image forming apparatus 2M updates a management table (ACT11). The system controller 11 stores the management table in the memory 32. The system controller 11 updates the management table on the memory 32 in sequence.

Figure 4:
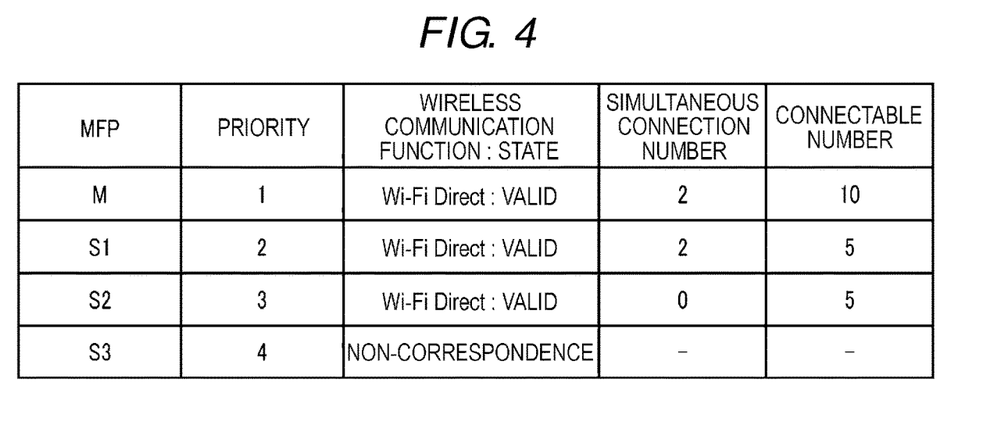
FIG. 4 is a diagram illustrating an example of a management table for the image forming apparatus.

FIG. 4 is a diagram illustrating an example of a management table. As illustrated in FIG. 4, the management table is information that includes "priority", "validation/invalidation of a wireless communication function", a "simultaneous connection number", and a "connectable number" for each image forming apparatus 2 inside the same network.

The "priority" is information indicating the degree of preference between the image forming apparatuses 2 inside the same network. For example, the "priority" is set in advance in accordance with a previous process history or the specification of the image forming apparatus 2. For example, the "priority" is set in accordance with a previous printing frequency.

For example, the "priority" may be set in accordance with a radio wave situation of the image forming apparatus 2.

For example, the "priority" may be set in order in which the "connectable number" of the image forming apparatus 2 is more.

The "validation/invalidation of a wireless communication function" is information indicating that Wi-Fi Direct is validated. For example, the "validation/invalidation of a wireless communication function" is configured as information indicating whether the image forming apparatus 2 operates in the first power-saving mode or the standby mode in which Wi-Fi Direct is validated or operates in the second power-saving mode.

The "simultaneous connection number" is information indicating the number of information processing apparatuses 3 with which the image forming apparatus 2 establishes the wireless communication in conformity with Wi-Fi Direct.

The "connectable number" is information indicating the upper limit of the number of information processing apparatuses 3 set in advance in accordance with the specification of the image forming apparatus 2 and capable of simultaneously performing the wireless communication in conformity with Wi-Fi Direct.

The system controller 11 acquires the "validation/invalidation of the wireless communication functions", the "simultaneous connection numbers", and the "connectable numbers" from the other image forming apparatuses 2 via the second communication interface 18. The system controller 11 updates the management table based on the acquired "validation/invalidation of the wireless communication functions", "simultaneous connection numbers", and "connectable numbers". The system controller 11 may update the "priority" of the management table based on the acquired "validation/invalidation of the wireless communication functions", "simultaneous connection numbers", and "connectable numbers". The system controller 11 may be configured to acquire the "validation/invalidation of the wireless communication functions", the "simultaneous connection numbers", and the "connectable numbers" from the other image forming apparatuses 2 via the first communication interface 12.

That is, the system controller 11 of the image forming apparatus 2M determines whether the number of valid wireless apparatuses is 2 or more based on the management table (ACT12). That is, the system controller 11 determines whether there are two or more image forming apparatuses including the self-image forming apparatus 2 of which the "validation/invalidation of the wireless communication function" is "valid" based on the management table.

When the system controller 11 determines that there are two or more image forming apparatuses 2 of which the wireless communication function is valid (YES in ACT12), the system controller 11 determines whether the sum of the simultaneous connection number is equal to or less than the connectable number of one image forming apparatus 2 (ACT13).

When the system controller 11 determines that there is no image forming apparatus 2 for which the sum of the simultaneous connection numbers is equal to or less than the connectable number (NO in ACT13), the process proceeds to ACT11. That is, when the system controller 11 determines that the number of image forming apparatuses 2 of which the wireless communication function is valid is equal to or greater than 2 and there is no image forming apparatus 2 of which the sum of the simultaneous connection numbers is equal to or less than the connectable number, the current state is maintained.

When the system controller 11 determines that there is the image forming apparatus 2 of which the sum of the simultaneous connection numbers is equal to or less than the connectable number (YES in ACT13), the system controller 11 determines the image forming apparatus 2 of which the wireless communication function is maintained (ACT14).

For example, the system controller 11 determines whether the sum of the simultaneous connection numbers is equal to or less than the connectable number in order in which the "priority" of the management table is higher in ACT13. The system controller 11 determines the image forming apparatus 2 for which the sum of the simultaneous connection numbers is equal to or less than the connectable number as the image forming apparatus 2 of which the wireless communication function is maintained.

The system controller 11 invalidates the wireless communication function of the other image forming apparatus 2 other than the image forming apparatus 2 of which the wireless communication function is determined to be maintained (ACT15) and ends the process.

For example, the image forming apparatus 2 for which the wireless communication function is determined to be maintained is the image forming apparatus 2M. In this case, the system controller 11 of the image forming apparatus 2M supplies a control signal for instructing the other image forming apparatuses 2 to proceed to the second power-saving mode. The image forming apparatuses 2 receiving the control signal for instructing the image forming apparatuses 2 to proceed to the second power-saving mode transmit information for connection to the image forming apparatus 2M of which the wireless communication function is maintained to the information processing apparatus 3 connected to the self-image forming apparatus 2, and then the mode proceeds to the second power-saving mode.

For example, the image forming apparatus 2 for which the wireless communication function is determined to be maintained is assumed to be different from the image forming apparatus 2M. In this case, the system controller 11 of the image forming apparatus 2M supplies the management table to the image forming apparatus 2 of which the wireless communication function is maintained. Thus, the image forming apparatus 2 receiving the management table functions as a master later. The system controller 11 of the image forming apparatus 2M supplies a control signal for instructing the image forming apparatus 2 invalidating the wireless communication function to proceed the mode to the second power-saving mode and the mode of the image forming apparatus 2M proceeds to the second power-saving mode.

Figure 5:
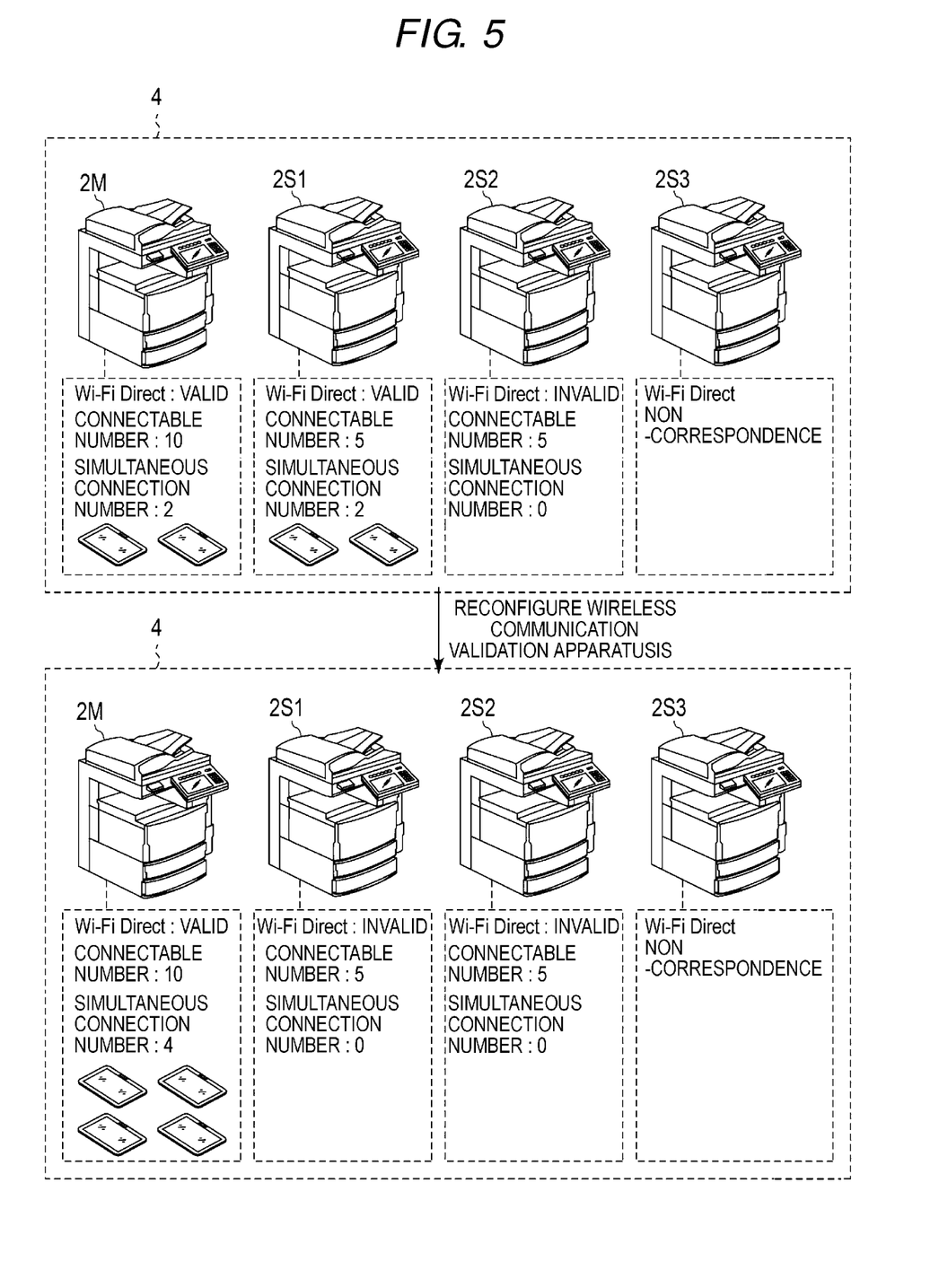
FIG. 5 is a diagram illustrating an example of an operation of the image forming apparatus.

FIG. 5 is a diagram illustrating an example when the processes of ACT11 to ACT15 are performed in the example of the management table illustrated in FIG. 4. In the example of FIG. 5, to differentiate the image forming apparatuses 2, the image forming apparatuses inside the network 4 are referred to as the image forming apparatuses 2M, 2S1, 2S2, and 2S3.

As illustrated in FIG. 5, in the image forming apparatus 2M, the "wireless communication function" is "valid", the "connectable number" is "10", and the "simultaneous connection number" is "2". In the image forming apparatus 2S1, the "wireless communication function" is "valid", the "connectable number" is "5", and the "simultaneous connection number" is "2". In the image forming apparatus 2S2, the "wireless communication function" is "invalid", the "connectable number" is "5", and the "simultaneous connection number" is "0". In the image forming apparatus 2S3, the "wireless communication function" is "invalid (non-correspondence)".

In the foregoing example, the number of image forming apparatuses 2 of which the wireless communication function is valid is 2 and the sum of the simultaneous connection numbers is "4". According to the example, the system controller 11 of the image forming apparatus 2M functioning as the master determines that the number of image forming apparatuses 2 of which the wireless communication function is valid is 2 or more in the process of ACT12. The system controller 11 of the image forming apparatus 2M determines that there is the image forming apparatus 2 of which the sum of the simultaneous connection numbers is equal to or less than the connectable number in the process of ACT13.

In this case, the system controller 11 of the image forming apparatus 2M maintains the wireless communication function of the image forming apparatus 2M and determines that the wireless communication function of the image forming apparatus 2S1 is turned off.

The system controller 11 of the image forming apparatus 2S1 transmits information for connection to the image forming apparatus 2M to the information processing apparatus 3 connected to the self-image forming apparatus. Further, the system controller 11 of the image forming apparatus 2S1 causes the image forming apparatus 2S1 to proceed to the second power-saving mode.

The information processing apparatus 3 of which the connection with the image forming apparatus 2S1 is disconnected transmits a connection request to the image forming apparatus 2M.

The system controller 11 of the image forming apparatus 2M establishes the wireless communication with the information processing apparatus 3 in response to the connection request from the information processing apparatus 3.

As a result, as illustrated in FIG. 5, in the image forming apparatus 2M, the "wireless communication function" is maintained to be "valid" and the "simultaneous connection number" is increased from "2" to "4". The "wireless communication function" of the image forming apparatus 2S1, the image forming apparatus 2S2, and the image forming apparatus 2S3 becomes "invalid". That is, through the processes of ACT11 to ACT15 of FIG. 3, the number of image forming apparatuses 2 of which the "wireless communication function" is "valid" is decreased from 2 to 1.

In ACT12 of FIG. 3, when it is determined that the number of image forming apparatuses 2 of which the wireless communication function is valid is not equal to or more than 2 (NO in ACT12), the system controller 11 determines whether there is a connection request from the information processing apparatus 3 (ACT16).

When the system controller 11 determines that there is no connection request from the information processing apparatus 3 (NO in ACT16), the process proceeds to ACT11. That is, the system controller 11 maintains the current state when there is no connection request from the information processing apparatus 3.

When the system controller 11 determines that there is the connection request from the information processing apparatus 3 (YES in ACT16), the system controller 11 determines whether the simultaneous connection number reaches the connectable number of image forming apparatuses 2 of which the wireless communication function is valid (ACT17).

When the system controller 11 determines that the simultaneous connection number does not reach the connectable number of image forming apparatuses 2 of which the wireless communication function is valid (NO in ACT17), the process proceeds to ACT11. That is, when the number of image forming apparatuses 2 of which the wireless communication function is valid is 1 and the simultaneous connection number is less than the connectable number, the system controller 11 establishes the wireless communication with the information processing apparatus 3 in response to the connection request, and then the process proceeds to ACT11.

When the system controller 11 determines that the simultaneous connection number reaches the connectable number of image forming apparatuses 2 of which the wireless communication function is valid (YES in ACT17), the system controller 11 determines the image forming apparatus 2 of which the wireless communication function becomes valid from the invalidation (ACT18). That is, when the number of image forming apparatuses 2 of which the wireless communication function is valid is 1, the simultaneous connection number reaches the connectable number, and the connection request is received, the system controller 11 validates the wireless communication functions of the other image forming apparatuses 2.

For example, the system controller 11 determines, of the image forming apparatuses 2 of which the wireless communication function is invalid, the image forming apparatus 2 with the highest "priority" as the image forming apparatus 2 of which the wireless communication function becomes valid from the invalidation.

The system controller 11 validates the wireless communication function of the image forming apparatuses 2 of which the wireless communication function is determined to become valid from the invalidation (ACT19) and ends the process. For example, the system controller 11 supplies a control signal for instructing the image forming apparatuses 2 of which the wireless communication function is determined to become valid from the invalidation to proceed to the first power-saving mode. The system controller 11 may be configured to supply information (for example, SSID) for connection to the image forming apparatuses 2 of which the wireless communication function becomes valid from the invalidation to the information processing apparatus transmitting the connection request.

The image forming apparatus 2 receiving the control signal for giving an instruction to proceed to the first power-saving mode validates the wireless communication function and enters a state in which the connection request is received from the information processing apparatus 3.

Figure 6:
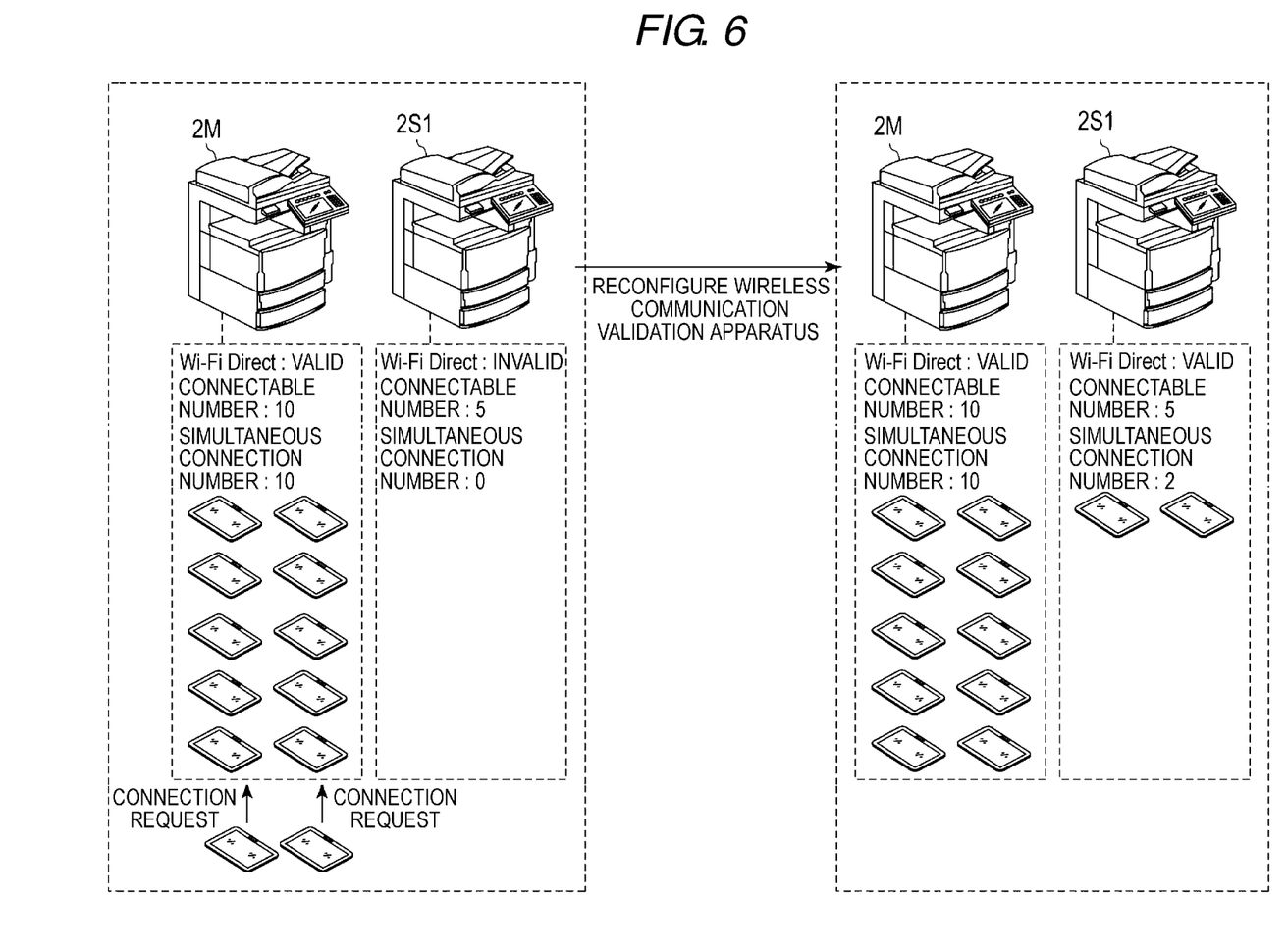
FIG. 6 is a diagram illustrating an example of an operation of the image forming apparatus.

FIG. 6 is a diagram illustrating an example when the processes of ACT16 to ACT19 are performed. In the example of FIG. 6, to differentiate the image forming apparatuses 2, the image forming apparatuses inside the network 4 are referred to as the image forming apparatuses 2M and 2S1.

As illustrated in FIG. 6, in the image forming apparatus 2M, the "wireless communication function" is "valid", the "connectable number" is "10", and the "simultaneous connection number" is "10". In the image forming apparatus 2S1, the "wireless communication function" is "invalid", the "connectable number" is "5", and the "simultaneous connection number" is "0".

In the foregoing example, the number of image forming apparatuses 2 of which the wireless communication function is valid is 1 and the sum of the simultaneous connection numbers is "10". Further, it is assumed that there is a connection request from the information processing apparatus 3. In this case, the system controller 11 of the master image forming apparatus 2M determines that the wireless communication functions of the other image forming apparatuses 2 are validated in the processes of ACT16 and ACT17. The system controller 11 of the image forming apparatus 2M switches the invalidation of the wireless communication function of the image forming apparatus 2S1 to validation. Further, the system controller 11 of the image forming apparatus 2M supplies information for connection to the image forming apparatus 2S1 to the information processing apparatus 3 transmitting the connection request.

When the control signal for switching the invalidation of the wireless communication function to the validation is received, the image forming apparatus 2S1 causes the second power-saving mode to proceed to the first power-saving mode.

The information processing apparatus 3 transmitting the connection request to the image forming apparatus 2M transmits the connection request to the image forming apparatus 2S1 based on the information received from the image forming apparatus 2M.

The system controller 11 of the image forming apparatus 2S1 establishes the wireless communication with the information processing apparatus 3 in response to the connection request from the information processing apparatus 3.

As a result, as illustrated in FIG. 6, in the image forming apparatus 2S1, the "invalidation" of the "wireless communication function" is "valid", two information processing apparatuses 3 transmitting the connection request to the image forming apparatus 2M are connected, and the "simultaneous connection number" is "2". That is, through the processes of ACT16 to ACT19 of FIG. 3, the image forming apparatus 2M can cause the "wireless communication function" of the other image forming apparatus 2S1 to be "valid" when there is the information processing apparatus 3 which is not connectable.

As described above, the master image forming apparatus 2 has information (a management table) regarding the "priority", the "validation/invalidation of the wireless communication functions", the "simultaneous connection numbers", and the "connectable number" of the other image forming apparatuses 2. The master image forming apparatus 2 acquires the information from the other image forming apparatuses 2 in order and updates the management table. The master image forming apparatus 2 controls the validation and invalidation of the wireless communication functions of the self-image forming apparatus and other image forming apparatuses 2 based on the sum (the sum of the simultaneous connection numbers) of the information processing apparatuses 3 connected to the image forming apparatus 2 of which the wireless communication function is "valid" and the connectable number of each image forming apparatus 2.

Specifically, when the number of image forming apparatuses 2 of which the wireless communication function is valid is plural and the sum of the clients connected to the image forming apparatus 2 is equal to or less than the connectable number of one image forming apparatus 2, the master image forming apparatus 2 maintains the wireless communication function of one image forming apparatus 2 and invalidates the wireless communication functions of the other image forming apparatuses 2. Thus, it is possible to prevent a situation in which the wireless communication functions of the plurality of image forming apparatuses 2 may not transition to a power-saving state despite being valid.

When the simultaneous connection number reaches the connectable number and a connection request is received from the information processing apparatus 3, the master image forming apparatus 2 validates the wireless communication functions of the other image forming apparatuses 2 and supplies information for connection to the validated image forming apparatuses 2 to the information processing apparatus 3 transmitting the connection request. Thus, it is possible to prevent a situation in which the information processing apparatus 3 may not be connected to the image forming apparatus 2.

In the foregoing embodiments, the examples of the image forming apparatuses 2 are descried, but any apparatus can be used as long as the apparatus receives an instruction from a client through wireless communication and operates. For example, a wireless communication device such as a drone or a camera that has the wireless communication function may be used.

The functions described in each of the above-described embodiments can be configured using hardware and can also be realized by causing a computer to read a program that describes each function using software. Each function may be configured by appropriately selecting either hardware or software.

While certain embodiments have been described, these embodiments have been presented by way of example only, and are not intended to limit the scope of inventions. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A wireless communication apparatus, comprising:
   a communication interface configured to perform wireless communication with other wireless communication apparatuses and a client giving an instruction for an operation; and
   a processor configured to switch a power state of the other wireless communication apparatuses based on information regarding validation and invalidation of wireless communication functions of own wireless communication apparatuses, simultaneous connectable numbers of the own wireless communication apparatuses, and simultaneous connection numbers of the other wireless communication apparatuses when a sum of the simultaneous connection numbers of the other wireless communication apparatuses for which the wireless communication functions is valid is equal to or less than the connectable number of own wireless communication apparatuses, the processor switches the wireless communication function of the other wireless communication apparatuses from validation to invalidation.

2. The apparatus according to claim 1, wherein the processor switches between the validation and the invalidation of the wireless communication function of the other wireless communication apparatuses and the communication interface based on the information regarding the validation and the invalidation of the wireless communication functions, the simultaneous connection numbers, and the connectable numbers of the other wireless communication apparatuses.

3. The apparatus according to claim 2, wherein when the simultaneous connection number is equal to the connectable number and a connection request is received from the client, the processor validates the wireless communication function of the wireless communication apparatus of which the wireless communication function is invalidated.

4. The apparatus according to claim 1, wherein the power state comprises at least one of a standby mode in which consumption power is the largest, a first power-saving mode in which the power consumption is less than in the standby mode, and a second power-saving mode in which the power consumption is less than in the first power-saving mode.

5. The apparatus according to claim 1, wherein the wireless communication apparatus comprising the communication interface is a master image forming apparatus further configured to control operations of the other wireless communication apparatuses.

6. The apparatus according to claim 1, wherein the wireless communication apparatus comprising the communication interface is a multifunction peripheral apparatus.

7. The apparatus according to claim 1, wherein the processor of the other wireless communication apparatuses that switch from validation to invalidation sends information for connecting to wireless communication apparatuses to the client connected to itself.

8. An image forming apparatus, comprising:
a communication interface configured to perform wireless communication with other image forming apparatuses and a client giving an instruction for printing;
an image forming unit configured to form an image on a printing medium based on the instruction for printing; and
a processor configured to switch a power state of the the other image forming apparatuses based on information regarding validation and invalidation of wireless communication functions of own wireless communication apparatuses, simultaneous connectable numbers of the own wireless communication apparatuses, and simultaneous connection numbers of the other image forming apparatuses when a sum of the simultaneous connection numbers of the other wireless communication apparatuses for which the wireless communication functions is valid is equal to or less than the connectable number of own wireless communication apparatuses, the processor switches the wireless communication function of the other wireless communication apparatuses from validation to invalidation.

9. The apparatus according to claim 8, wherein the processor switches between the validation and the invalidation of the wireless communication function of the other image forming apparatuses and the communication interface based on the information regarding the validation and the invalidation of the wireless communication functions, the simultaneous connection numbers, and the connectable numbers of the other image forming apparatuses.

10. The apparatus according to claim 9, wherein when the simultaneous connection number is equal to the connectable number and a connection request is received from the client, the processor validates the wireless communication function of the image forming apparatus of which the wireless communication function is invalidated.

11. The apparatus according to claim 8, wherein the power state comprises at least one of a standby mode in which consumption power is the largest, a first power-saving mode in which the power consumption is less than in the standby mode, and a second power-saving mode in which the power consumption is less than in the first power-saving mode.

12. The apparatus according to claim 8, wherein the image forming apparatus comprising the communication interface is a master image forming apparatus further configured to control operations of the other image forming apparatuses.

13. The apparatus according to claim 8, wherein the image forming apparatus comprising the communication interface is a multifunction peripheral apparatus.

14. The apparatus according to claim 8, wherein the processor of the other wireless communication apparatuses that switch from validation to invalidation sends information for connecting to wireless communication apparatuses to the client connected to itself.

15. A method of controlling an image forming apparatus including a communication interface that performs wireless communication with other image forming apparatuses and a client giving an instruction for printing, an image forming unit that forms an image on a printing medium based on the instruction for printing, and a processor, the method comprising:
switching, by the processor, a power state of other image forming apparatus based on information regarding validation and invalidation of wireless communication functions of own wireless communication apparatuses, simultaneous connectable numbers of the own wireless communication apparatuses, and simultaneous connection numbers of the other image forming apparatuses when a sum of the simultaneous connection numbers of the other wireless communication apparatuses for which the wireless communication functions is valid is equal to or less than the connectable number of own wireless communication apparatuses, the processor switches the wireless communication function of the other wireless communication apparatuses from validation to invalidation.

16. The method according to claim 15, further comprising:
switching, by the processor, between the validation and the invalidation of the wireless communication function of the other image forming apparatuses and the communication interface based on the information regarding the validation and the invalidation of the wireless communication functions, the simultaneous connection numbers, and the connectable numbers of the other image forming apparatuses.

17. The method according to claim 16, further comprising:
validating, by the processor, the wireless communication function of the image forming apparatus of which the wireless communication function is invalidated when the simultaneous connection number is equal to the connectable number and a connection request is received from the client.

18. The method according to claim 15, wherein the power state comprises at least one of a standby mode in which consumption power is the largest, a first power-saving mode in which the power consumption is less than in the standby mode, and a second power-saving mode in which the power consumption is less than in the first power-saving mode.

19. The method according to claim 15, wherein the image forming apparatus comprising the communication interface is a master image forming apparatus,
the method further comprising controlling operations of the other image forming apparatuses.

20. The method according to claim 15, wherein the processor of the other wireless communication apparatuses that switch from validation to invalidation sends information for connecting to wireless communication apparatuses to the client connected to itself.

* * * * *